United States Patent Office 2,889,378
Patented June 2, 1959

2,889,378

REMOVAL OF ACETYLENE FROM FLUORINE-CONTAINING MONO-OLEFINS

Heinz G. Boettger and William C. Ruch, Baton Rouge, La., assignors to Allied Chemical Corporation, a corporation of New York No Drawing. Application March 11, 1957
Serial No. 644,982

11 Claims. (Cl. 260—653.3)

This invention relates to the purification of fluorocarbon compounds containing acetylene as an impurity, and is directed more particularly to separation of relatively small amounts of acetylene contaminants associated with such compounds.

Certain fluoro and halofluorocarbon compounds made by known methods unavoidably contain acetylene in amounts which, though usually small, are objectionable with regard to subsequent uses and processes in which these compounds may be employed. For example, British open specification 19,896, open for public inspection January 24, 1948, discloses processes for making vinylidene fluoride, $CH_2=CF_2$, by procedure involving reaction of 1,1-difluoroethane, $CH_3CHF_2$, with elemental chlorine at temperatures of the order of 500–750° C. U.S. Patent 2,599,631 of June 10, 1952, discloses manufacture of vinyl fluoride, $CH_2=CHF$, by pyrolysis of 1,1-difluoroethane at temperatures of the order of 600–800° C. U.S. Patent 2,425,991 of August 19, 1947, describes production of 1,1-difluoroethane by reaction of acetylene and HF in the liquid phase in the presence of catalytic amounts of boron trifluoride. U.S. Patent 2,462,359 of February 22, 1945, describes manufacture of vinyl fluoride and 1,1-difluoroethane by reaction of acetylene and HF in the presence of fluosulfonic acid. Products resulting from formation of $CH_3CHF_2$ and $CH_2=CHF$ by reaction of acetylene and HF contain small amounts of acetylene as an impurity. Further $CH_2=CF_2$ and $CH_2=CHF$ made by processes involving dehydrochlorination or pyrolysis of $CH_3CHF_2$, as a rule, contain small quantities of acetylene resulting from decomposition. Hence, vinylidene fluoride and vinyl fluoride products made by foregoing dehydrochlorination anl pyrolysis methods may contain small but significantly objectionable amounts of acetylene, the total quantity of which may be the sum of acetylene impurity contained in $CH_3CHF_2$, as a result of its method of manufacture, plus any small amounts of acetylene which may be formed as decomposition product during dehydrochlorination or pyrolysis of such $CH_3CHF_2$ to form $CH_2=CF_2$ or $CH_2=CHF$. Particularly, when materials such as $CH_2=CF_2$ and $CH_2=CHF$ are to be subsequently used as monomers, the presence of small amounts of acetylene therein is highly disadvantageous. Especially with respect to fluoro and chlorofluorocarbon compounds boiling close to room temperature and particularly below zero degrees centigrade, removal of small amounts of acetylene therefrom by even the best controlled known distillation methods is commercially unsatisfactory.

Know commercial practice for removal of $C_2H_2$ from gases involves chiefly use of the ammoniacal cuprous chloride process and its modification. Disadvantages adherent in this process are disposal of waste materials which have to be neutralized, constant replacement of ammonia and copper, and purification of the gas treated in order to remove considerable amounts of ammonia which are picked up by the gas undergoing treatment and which must be removed. Further, the copper acetylide formed in the cuprous-ammonia-chloride process as well as the acetylene released by decomposing the wet copper acetylide are hazardous.

A principal object of the present invention lies in the provision of a process which effects efficient removal of $C_2H_2$ from gases and which does not entail any of the obvious disadvantages of the commonly used ammoniacal cuprous chloride process. More particularly, the invention provides for separation, from gases containing or consisting of fluoro and chlorofluorocarbon compounds of small amounts of contaminating $C_2H_2$, and if desired accomplishes reduction of $C_2H_2$ impurity content to only a few parts per million by a simple easily controlled process in which the gas containing $C_2H_2$ as impurity is subjected in a suitable reactor at elevated temperatures to the action of certain solid treating agents.

In accordance with the invention, it has been found that oxidized metallic copper treating agents are surprisingly active with regard to separation of relatively small amounts of $C_2H_2$ from fluorocarbon compounds described herein. We find that any form of partially or completely oxidized copper, preferably dispersed, and with or without an inert support or a promoter enhancing the surface dispersion and activitiy of the copper oxide may be employed to advantage. Preferably, the copper oxide is dominantly CuO, and ordinarily contains not more than a small amount of $Cu_2O$. Reagent grade CuO is satisfactory. To obtain physical stability and enhancement of activity, it is preferred to suspend the copper oxide on an inert carrier such as Carborundum. The copper oxide treating agents may be made by soaking e.g. ¼" Carborundum balls or other suitable discretely formed support in a saturated solution of copper nitrate, drying, and subsequently igniting at 500–600° C. This procedure may be repeated until the carrier has a copper oxide loading in the range of about 5–35% by weight.

In the practice of the invention process, copper oxide treating agents function by extracting $C_2H_2$ from the gas being treated and accumulating the acetylenic material removed from the gas stream in the reactor in association with the treating agent. Experience shows remarkable treating agent longevity of the order of several hundred hours. An outstanding advantage of the invention is that no treating agent replacement costs are involved. When significant decrease of treating activity is noted, e.g. by sampling tests of the gaseous exit of the reactor, input of gas undergoing treatment in the reaction zone may be suspended, and the treating agent regenerated by passing air or oxygen thru the reactor at temperature of about 500–600° C. to burn off the acetylenic carbonaceous deposits which have been formed and accumulated on the treating agent. At the same time all the copper is re-oxidized to substantially cupric oxide. Waste products of the regeneration cycle, i.e. unobjectionable carbon dioxide and water vapor, may be vented directly to the atmosphere. Subsequent to cooling to below 500° C. and preferably not more than 400° C., the regenerated treating agent is again ready for use. The treating agent may be regenerated repeatedly, precaution being taken to regulate regeneration temperatures so as not to exceed that at which incipient fusion of copper oxide may take place.

A further advantage afforded by the invention is the simple apparatus required. The reactor or treating chamber may be a steel tube packed with treating agent, and provided with an inlet for introduction of gas to be treated, electrical equipment for maintaining herein specified reaction zone temperatures, and a gas outlet connected to conventional means for condensing and recovering purified product. Operation may be carried out at any convenient pressure, e.g. substantially atmospheric or higher.

In accordance with the invention, it has been found that the herein described treating agents effect separation of $C_2H_2$ from fluorocarbon mono-olefines without causing any significant decomposition of the olefines. Hence, the invention is directed to treatment and purification of gases which, in conjunction with $C_2H_2$ contaminant, contain or consist substantially of halogenated mono-olefines containing two carbon atoms, at least one fluorine atom, and are free of elements other than carbon, hydrogen, chlorine and fluorine. Such halogenated mono-olefines may be represented by the formula $CXY=CZF$ in which X, Y, and Z are each selected from the group consisting of hydrogen, chlorine and fluorine. Such the invention is particularly directed to separation of $C_2H_2$ impurities from mono-olefines which, because of their boiling points, are difficultly or not feasibly separable from $C_2H_2$ by known commercially applicable operations e.g. distillation, halogenated mono-olefines which may be subjected to purification treatment include compounds boiling below about 25° C. at atmospheric pressure such as $CHCl=CHF$, $CClF=CClF$, and $CCl_2=CF_2$. Moreover, we find that the $C_2H_2$ extraction properties of the copper oxide treating agents are such as to afford greater advantages as the boiling points of the mono-olefines decrease. Thus the preferred fluorocarbon compounds subjected to purification treatment are preferably two carbon atom mono-olefine compounds boiling below about minus 15° C. at atmospheric pressure such as $CH_2=CClF$, $CClF=CHF$, $CHCl=CF_2$, and $CClF=CF_2$, and more especially those two carbon atom mono-olefines boiling not substantially higher than about minus 50° C. such as $CH_2=CHF$, $CH_2=CF_2$, $CHF=CHF$, $CHF=CF_2$, and $CF_2=CF_2$. While gases undergoing treatment may contain mono-olefines in any concentration, it is preferred to utilize gases which are dominantly mono-olefines by weight and volume.

In practice of the invention, the gas to be treated is fed into and through a reactor packed with the copper oxide treating agent described and maintained at temperature substantially in the range of 150–500° C. and below the temperature at which fluorocarbon material being treated significantly decomposes. While some reaction is initiated at about 150° C., particularly where it is desired to reduce $C_2H_2$ content to substantially less than 100 p.p.m., temperatures should not be below about 250° C. At temperatures above about 500° C., treating agent activity deteriorates rapidly. Hence, temperatures above about 500° C. should be avoided. Some of the fluorocarbon materials susceptible to purification treatment in accordance with the invention may show tendency to decompose at temperatures lower than 500° C. In this event, maximum operating temperatures should not be higher than say 25° C. below the temperature at which the material being treated tends to significantly decompose. For most fluorocarbon gases commonly found contaminated with acetylene, temperature range of about 250–400° C. are preferred, and, assuming suitable space velocity, temperatures around 300° C. are satisfactory for purification treatment of the hereindescribed fluorocarbon compounds.

Contact time or space velocity (SVH—volumes of reactant gas at room temperature per volume of catalyst per hour) may vary widely, e.g. in the range of 100–2200 SVH. In most instances, other conditions such as temperature and volume of catalyst being equal, contact time may be varied within reasonable limits without noticeable sacrifice in advantageous high efficiency of operation. However, if contact time is excessive, i.e. at very low space velocities, the capacity of the reactor is low thereby causing economic disadvantages in the operation. On the other hand, if contact time is too short, i.e. high space velocities, $C_2H_2$ extraction from the gas stream undergoing treatment is correspondingly lessened. In a particular operation, optimum rate of gas flow through the reaction zone is dependent upon variables such as scale of operation, temperature, degree of purification desired, quantity of treating agent in the reactor, and specific apparatus employed and may be best determined by test runs. Gases treated in accordance with the invention may contain from a few parts per million to as much as e.g. 5% by weight (50,000 p.p.m.). Degree of purification is dependent mostly on temperature, volume of treating agent and space velocity. In any case, contact time should be sufficient to effect removal of a substantial amount of $C_2H_2$ from the gas being treated, and as demonstrated by the following examples, at temperatures in the range of about 250–400° C., more preferably not substantially higher than 350° C., volume of treating agent and space velocity may be so coordinated as to effect $C_2H_2$ removal down to less than 10 p.p.m.

In the following examples, illustrating practice of the invention, p.p.m. indicates parts per million by weight, and unless otherwise indicated all gas percentages are by volume at standard conditions.

*Example 1.*—Twenty-eight hundred parts by weight of a gas at pressure of about 100 p.s.i.g. and containing plus 95% of $CH_2=CF_2$, about 0.5% of $CH_2=CHF$, small amounts of acid (HCl and HF), moisture, $O_2$, non-condensables (at minus 195° C.) and from 1000–1500 p. p.m. of $C_2H_2$, were run into and thru a tubular steel reactor packed with about 0.001 cu. foot of a catalyst made as above indicated and comprising ¼" Carborundum balls impregnated with copper oxide in amount such that at the start of the run the catalyst contained about 5% by weight of CuO. Throughout the run, temperature in the reactor was maintained at about 280° C., pressure at about 100 p.s.i.g., and space velocity at about 1000 SVH. The gas exiting the reactor contained about 0.5% of $CH_2=CHF$, and less than 10 p. p.m. of $C_2H_2$ by infrared analysis. Less than 5 p.p.m. of HF were formed during the operation. Otherwise the exit gas was of the same composition as the feed gas.

*Example 2.*—In this run, a gas, of substantially the same composition as in Example 1 except that the $C_2H_2$ content was about 350 p.p.m., was run at pressure of about 100 p.s.i.g. into and thru a tubular steel reactor packed with 0.087 cu. foot of a supported cupric oxide treating agent as employed in Example 1 and containing about 5% by weight of CuO. Temperature during the run was maintained at about 280° C., pressure at about 100 p.s.i.g., and SVH in the range of 500–1000. Less than 5 p.p.m. of HF were formed during the operation. There was no other perceptible change in composition of the reactor exit gas except that the $C_2H_2$ content was reduced to less than 10 p.p.m.

*Example 3.*—Five thousand eight hundred seventy-eight parts by weight of a gas, having an average composition of about 95% $CH_2=CF_2$, average $C_2H_2$ of about 305 p.p.m. and a maximum $C_2H_2$ content of about 1800 p.p.m. and containing 0.2–3.0% of $CH_2=CHF$, plus small amounts of $O_2$, non-condensables (at minus 195° C.) gas, and moisture were fed at pressure of about 100 p.s.i.g. into and thru a tubular steel reactor packed with about 0.09 cu. ft. of a treating agent consisting of ¼" Carborundum balls impregnated with about 10% by weight of CuO at the start of the run. Throughout the run, temperature was maintained at about 280° C., pressure in the reactor was about 100 p.s.i.g., and space velocity was in the range of 300–400 SVH. Less than 5 p.p.m. of HF were formed during the operation. Otherwise, the composition of the exit gas of the reactor showed no composition change except that the $C_2H_2$ content was reduced to less than 10 p.p.m.

*Example 4.*—About 100 cu. ft. of a substantially dry relatively crude gas at about atmospheric pressure and containing about 42.5% of $CH_2=CF_2$, about 6.4% of $CHCl=CHF_2$, about 7.1% of $CCl_2=CF_2$, about 40% of $CH_3CClF_2$, plus a total of about 4% of other chlorinated difluoroethanes, ethylenes, oxygen, moisture and non-condensable (at minus 195° C.) gases, and containing about 400 p.p.m. of acetylene, were fed into and thru a tubular reactor packed with about 0.001 cu. ft. of treating agent consisting of ¼″ Carborundum balls impregnated with and containing about 15% by weight of CuO at the start of the run. Throughout the run, temperature in the reactor was maintained at about 300° C., pressure at about 0.5 p.s.i.g., and space velocity averaged about 500 SVH. Less than 20 p.p.m. of HF were formed during the operation. Otherwise the composition of the gas exiting the reactor was substantially the same as that of the feed gas, except that the exit gas had a $C_2H_2$ content of less than 10 p.p.m.

*Example 5.*—About 30 cu. ft. of a gas at pressure of about 70 p.s.i.g. and containing about 98% plus of $CH_2=CF_2$, about 0.5% of $CH_2=CHF$, 0.5% of non-condensables, about 50 p.p.m. of water, 500 p.p.m. of $C_2H_2$ were passed into and thru a tubular reactor packed with 0.001 cu. ft. of treating agent consisting of ¼″ Carborundum balls impregnated with about 10% by weight of CuO at the start of the run. Throughout the run, temperature in the reactor was maintained at about 270° C., space velocity at about 2100 SVH, and pressure in the reactor was about 70 p.s.i.g. The composition of the gas exiting the reactor was substantially the same as that of the feed gas except that the $C_2H_2$ content had been reduced to less than 10 p.p.m.

*Example 6.*—The feed gas used during the runs of this example and of Examples 7–9 had compositions in the range of 80–95% of $CH_2=CHF$, 20–5% $CH_3CHF_2$, and 1.5–2% by weight of acetylene (15,000–20,000 p.p.m.) together with traces of HF and moisture, and was made by catalytic pyrolysis of $CH_3CHF_2$ at temperature of about 300° C. About 10 cu. ft. (STP) of such gas were fed into and thru a tubular reactor packed with about 0.004 cu. ft. of ¼″ Carborundum balls impregnated with about 10% CuO at the start of the run. Temperature over the length of the reactor averaged about 250° C. with a maximum hot spot temperature of about 290° C. Pressure in the reactor was about 2 p.s.i.g., and space velocity was about 100 SVH. Acetylene content of the reactor exit gas was less than 10 p.p.m. Otherwise, composition of unit gas was substantially the same as that of the feed gas.

*Example 7.*—About 10 cu. ft. (STP) of the feed gas described in Example 6 were passed into and thru the same reactor and treating agent as in Example 6. Temperature averaged about 300° C. with a hot spot of about 350° C., space velocity was about 500, and pressure in the reactor was about 2 p.s.i.g. There was no discernible decomposition or change in the composition of the gas exiting the reactor except that acetylene content was reduced to less than 10 p.p.m.

*Example 8.*—This run was a substantial duplicate of the run of Example 7 except that reaction temperature was maintained at about 250° C., space velocity was about 100 SVH, and pressure in the reactor 3 p.s.i.g. Reactor exit gas composition was the same as the composition of the feed gas except that the $C_2H_2$ content of the exit gas was about 60 p.p.m.

*Example 9.*—This run was the same as in Examples 7 and 8 except that reactor temperature was maintained at about 290° C., space velocity was about 1000 SVH, and pressure in the reactor was about 10 p.s.i.g. The composition of reactor exit gas was substantially the same as that of the feed gas except that the acetylene content was reduced to about 1000 p.p.m.

*Example 10.*—About 10 cu. ft. (STP) of a crude gas containing, in addition to $CH_2=CHF$, about 2% by weight (20,000 p.p.m.) of $C_2H_2$, and about 50% $CH_3CHF_2$ were passed into and thru the reactor and treating agent described in Examples 6–9. Reactor temperature was maintained at about 290° C., space velocity was about 100 SVH, and pressure in the reactor was about 3 p.s.i.g. With regard to the reactor exit gas there was no discernible decomposition or other change in gas composition as compared to the feed gas, except that the exit gas had acetylene content of less than 10 p.p.m.

We claim:

1. The process for separating acetylene from a gas comprising halogenated mono-olefine containing two carbon atoms, at least one fluorine atom, and being free of elements other than carbon, hydrogen, chlorine and fluorine, said gas containing a relatively small amount of $C_2H_2$ as impurity, which process comprises subjecting said gas to the action of solid oxidized metallic copper, at temperature substantially in the range of 150–500° C. and below the temperature at which olefinic material present significantly decomposes, for a period of time sufficient to effect removal of a substantial amount of $C_2H_2$ from said gas, and recovering halogenated mono-olefine having a substantially reduced amount of $C_2H_2$ associated therewith.

2. The process of claim 1 in which the mono-olefine has a boiling point below about 25° C. at atmospheric pressure.

3. The process of claim 1 in which temperature is substantially in the range of 250–400° C.

4. The process for separating acetylene from a gas comprising halogenated mono-olefine represented by the formula $CXY=CZF$ in which X, Y and Z are each selected from the group consisting of hydrogen, chlorine and fluorine, said gas containing a relatively small amount of $C_2H_2$ as impurity, which process comprises subjecting said gas to the action of solid oxidized metallic copper, at temperature substantially in the range of 150–500° C. and below the temperature at which olefinic material present significantly decomposes, for a period of time sufficient to effect removal of a substantial amount of $C_2H_2$ from said gas, and recovering halogenated mono-olefine having a substantially reduced amount of $C_2H_2$ associated therewith.

5. The process of claim 4 in which the mono-olefine has a boiling point below about 25° C. at atmospheric pressure.

6. The process of claim 4 in which temperature is substantially in the range of 250–400° C.

7. The process of claim 4 in which the oxidized metallic copper is dominantly in the form of cupric oxide.

8. The process for separating acetylene from a gas comprising dominantly a halogenated mono-olefine boiling at temperature below about minus 15° C. at atmospheric pressure and represented by the formula $CXY=CZF$ in which X, Y and Z are each selected from the group consisting of hydrogen, chlorine and fluorine, said gas containing a relatively small amount but substantially in excess of 10 p.p.m. of $C_2H_2$ as impurity, which process comprises contacting said gas with inert solid material impregnated with solid oxidized metallic copper, at temperatures substantially in the range of 250–400° C., continuing said contacting operation for a period of time sufficient to reduce the $C_2H_2$ content of said gas to less than 10 p.p.m., and recovering gas comprising said halogenated mono-olefine and containing less than 10 p.p.m. of $C_2H_2$.

9. The process of claim 8 in which the mono-olefine has a boiling point not substantially higher than minus 50° C., and said solid material is in the form of discrete bodies impregnated with 5–35% by weight of oxidized metallic copper dominantly cupric oxide.

10. The process of claim 8 in which the mono-olefine is $CH_2=CF_2$, and said solid material is in the form of discrete bodies of Carborundum impregnated with 5–35% by weight of oxidized metallic copper dominantly cupric oxide.

11. The process of claim 8 in which the mono-olefine is $CH_2=CHF$, and said solid material is in the form of discrete bodies of Carborundum impregnated with 5-35% by weight of oxidized metallic copper dominantly cupric oxide.

References Cited in the file of this patent

UNITED STATES PATENTS

| | | |
|---|---|---|
| 2,441,400 | Doumani et al. | May 11, 1948 |
| 2,566,136 | Morrel | Aug. 28, 1951 |
| 2,634,300 | Hillyer et al. | Apr. 7, 1953 |